(12) United States Patent
Sparapany et al.

(10) Patent No.: US 6,398,967 B2
(45) Date of Patent: *Jun. 4, 2002

(54) METHOD OF CLARIFYING WATER USING LOW MOLECULAR WEIGHT CATIONIC DISPERSION POLYMERS

(75) Inventors: John W. Sparapany, Bolingbrook; Richard P. Cardile; Cathy C. Johnson, both of Geneva; Angela P. Zagala, Naperville, all of IL (US)

(73) Assignee: Nalco Chemical Company, Naperville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/553,876

(22) Filed: Apr. 20, 2000

(51) Int. Cl.$^7$ .................................................. C02F 1/56
(52) U.S. Cl. ........................ 210/708; 210/728; 210/734; 516/174
(58) Field of Search ................................. 210/725, 727, 210/728, 734, 735, 708; 516/174

(56) References Cited

U.S. PATENT DOCUMENTS

| | | | |
|---|---|---|---|
| 4,929,655 A | | 5/1990 | Takeda et al. ............... 424/458 |
| 5,006,590 A | | 4/1991 | Takeda et al. ............... 524/458 |
| 5,451,326 A | * | 9/1995 | Carlson et al. ............... 210/708 |
| 5,531,907 A | * | 7/1996 | Williams et al. ............. 210/727 |
| 5,597,858 A | | 1/1997 | Ramesh et al. .............. 524/458 |
| 5,614,602 A | | 3/1997 | Connors et al. .......... 526/307.3 |
| 5,733,462 A | | 3/1998 | Mallon et al. ............... 210/728 |
| 5,750,034 A | | 5/1998 | Wing Shing et al. ....... 210/705 |
| 5,938,937 A | * | 8/1999 | Sparapang et al. ......... 210/728 |
| 6,019,904 A | * | 2/2000 | Wong Shing et al. ...... 210/705 |
| 6,036,868 A | * | 3/2000 | Sivakumar et al. ......... 210/708 |
| 6,171,505 B1 | * | 1/2001 | Maury et al. ............... 210/727 |

FOREIGN PATENT DOCUMENTS

| | | |
|---|---|---|
| CA | 2125545 AA | 12/1994 |
| EP | 183 466 B1 | 8/1990 |
| EP | 364 175 B1 | 12/1994 |
| EP | 657 478 A2 | 6/1995 |

\* cited by examiner

Primary Examiner—Peter A. Hruskoci
(74) Attorney, Agent, or Firm—Michael B. Martin; Thomas M. Breininger

(57) ABSTRACT

This invention is directed to a method of clarifying water comprising adding to the water an effective clarifying amount of a low molecular weight water-soluble cationic dispersion polymer prepared by polymerizing one or more cationic monomers and one or more nonionic monomers and one or more chain transfer agents under free radical forming conditions in an aqueous solution of an anionic salt in the presence of a stabilizer polymer, wherein the cationic dispersion has a cationic charge of from about 1.0 mole percent to about 75 mole percent and an RSV of from about 0.2 dl/g to about 6 dl/g.

9 Claims, No Drawings

US 6,398,967 B2

METHOD OF CLARIFYING WATER USING LOW MOLECULAR WEIGHT CATIONIC DISPERSION POLYMERS

TECHNICAL FIELD

This invention is directed to a method of clarifying water using low molecular weight, low charge cationic dispersion polymers.

BACKGROUND OF THE INVENTION

In the water treatment field of solids/liquid separation, suspended solids are removed from water by a variety of processes, including sedimentation, straining, flotation, filtration, coagulation, flocculation, and emulsion breaking among others. Additionally, after suspended solids are removed from the water they must often be dewatered so that they may be further treated or properly disposed of. Liquids treated for solids removal often have as little as several parts per billion of suspended solids or dispersed oils, or may contain large amounts of suspended solids or oils. Solids being dewatered may contain anywhere from 0.25 weight percent solids, to 40 or 50 weight percent solids material. Solids/liquid or liquid/liquid separation processes are designed to remove solids from liquids, or liquids from liquids.

While strictly mechanical means have been used to effect solids/liquid separation, modern methods often rely on mechanical separation techniques that are augmented by synthetic and natural polymeric materials to accelerate the rate at which solids can be removed from water. These processes include the treatment of raw water with cationic coagulant polymers that settle suspended particulates and make the water usable for industrial or municipal purposes. Other examples of these processes include the removal of colored soluble species from paper mill effluent wastes, the use of organic flocculant polymers to flocculate industrial and municipal waste materials, sludge recovery, emulsion breaking, drainage aids in the manufacture of pulp and paper and flotation aids in mining processing.

Clarification generally refers to the removal of nonsettleable material by coagulation, flocculation and sedimentation. Coagulation is the process of destabilization of the colloid by neutralization of the surface charge of the colloid. Once neutralized, particles no longer repel each other and can come together to form larger settleable solids. Coagulation is necessary for removal of colloidal sized suspended matter. Flocculation is the process of bringing together the destabilized, "coagulated" particles to form a larger agglomeration or floc for the purpose of increasing the solid-liquid separation process.

Clarification chemicals are typically utilized in conjunction with mechanical clarifiers for the removal of solids from the treated water. The clarification chemicals coagulate and/or flocculate the suspended solids into larger particles, which can then be removed from the water by gravitational settling or flotation.

Depending upon the characteristics of the water being treated, differing chemical types and programs may be utilized. It is conventional to utilize a dual polymer program for clarification of raw water in which an aluminum chemistry is commonly used with an organic coagulant to remove soluble color and other contaminants. Clarification of waste waters can depend on the nature of the solids being removed and the mechanical process. Chemical treatment for waste water clarification is typically employed when colloidal solids need to be removed so that the biochemical oxygen demand, chemical oxygen demand and total suspended solids being discharged to a receiving stream need to be minimized. Typically, this comprises using a low molecular weight cationic coagulant followed by a higher molecular weight flocculant.

Processes for the preparation of high molecular weight cationic dispersion polymer flocculants are described in U.S. Pat. Nos. 5,006,590 and 4,929,655. Use of a cationic dispersion polymer flocculant and a cationic coagulant for clarifying ink-laden water obtained from the recycling of paper stocks is disclosed in commonly assigned U.S. Pat. No. 5,750,034. High molecular weight, high polymer actives cationic dispersion polymers for water clarification, dewatering and retention and drainage are disclosed in commonly assigned U.S. Ser. No. 09/054,980. The use of high molecular weight cationic dispersion polymers as retention and drainage aids in papermaking is disclosed in commonly assigned EPA 97116538.6 and U.S. Ser. No. 09/010,156.

SUMMARY OF THE INVENTION

In its principal embodiment, this invention is directed to a method of clarifying water comprising adding to the water an effective clarifying amount of a low molecular weight water-soluble cationic dispersion polymer prepared by polymerizing one or more cationic monomers and one or more nonionic monomers and one or more chain transfer agents under free radical forming conditions in an aqueous solution of an anionic salt in the presence of a stabilizer polymer, wherein the cationic dispersion has a cationic charge of from about 1.0 mole percent to about 75 mole percent and an RSV of from about 0.2 dl/g to about 6 dl/g.

The cationic dispersion polymers of this invention have superior performance than conventional coagulants for clarifying raw, process and waste waters. The polymers of this invention also show equivalent or improved performance when the polymers are used as a coagulation aid for conditioning sludge for dewatering. The use of these polymers affords removal of particulate materials without the unwanted addition of oils and surfactants contained in conventional latex polymers. Additionally, these polymers require no inverter system and can be introduced to the process stream using simple feeding equipment.

The superior performance of very low molecular weight cationic dispersion polymers having significantly lower cationic charge than conventional coagulants, which typically have a cationic charge of 100 mole percent is unexpected. It is theorized that the mode of action is not solely charge neutralization, but may employ a mechanism of shielding where the anionic charge on the colloidal particle is effectively shielded from the anionic charge of another colloidal particle and the particles can agglomerate.

A further advantage of the cationic dispersion polymer of this invention is that it can be used as the sole treatment agent and the performance is often much greater than the conventional coagulants. Though other treatment agents may be added as adjuncts, they are not required for activity.

In another embodiment, this invention is directed to a method of dewatering sludge comprising adding to the sludge of an effective amount of a low molecular weight water-soluble cationic dispersion polymer prepared by polymerizing one or more cationic monomers and one or more nonionic monomers and one or more chain transfer agents under free radical forming conditions in an aqueous solution of an anionic salt in the presence of a stabilizer polymer, wherein the cationic dispersion has a cationic charge of from about 1.0 mole percent to about 75 mole percent and an RSV of from about 0.2 dl/g to about 6 dl/g.

In another embodiment, this invention is directed to a method for improving retention and drainage performance in a papermaking process comprising adding to a papermaking slurry an effective amount of a low molecular weight water-soluble cationic dispersion polymer prepared by polymerizing one or more cationic monomers and one or more nonionic monomers and one or more chain transfer agents under free radical forming conditions in an aqueous solution of an anionic salt in the presence of a stabilizer polymer, wherein the cationic dispersion has a cationic charge of from about 1.0 mole percent to about 75 mole percent and an RSV of from about 0.2 dl/g to about 6 dl/g.

Further, the aqueous dispersion of this invention, if required in the form of an aqueous solution resulting from dilution with water, can be advantageously used in a number of technological fields as flocculating agents, thickeners, soil conditioners, adhesives, food additives, dispersants, detergents and additives for medicines or cosmetics, among others.

DETAILED DESCRIPTION OF THE INVENTION

Definitions of Terms

As used herein, the following abbreviations and terms shall have the following meanings:

AcAm for acrylamide;
DMAEA.BCQ for dimethylaminoethylacrylate benzyl chloride quaternary salt;
DMAEA.MCQ for dimethylaminoethylacrylate methyl chloride quaternary salt;
EPI-DMA for epichlorohydrin-dimethlyamine;
AIVN for 2,2'-azobis(2,4-dimethylvaleronitrile); and
AIBN for 2,2'-azobis(2-methylpropionitrile).

"Raw water" means water from natural geographical sources including rivers, lakes, well water, rain water, and the like.

"Process water" means water used in a process such as a manufacturing process (paper machine), steel production, chemical production processes, refinery processes, food production processes (i.e., sugar process), and the like.

"Waste water" means water from a manufacturing process, municipal waste or other waters which are required to be treated prior to discharge to a receiving stream, lake or other water way.

"Papermaking process" means a method of making paper products from pulp comprising forming an aqueous cellulosic papermaking slurry, draining the slurry to form a sheet and drying the sheet. The steps of forming the papermaking slurry, draining and drying may be carried out in any conventional manner generally known to those skilled in the art. Conventional coagulants, conventional flocculants, alum, cationic starch or a combination thereof may be utilized as adjuncts with the low molecular weight cationic dispersion polymers of this invention, though it must be emphasized that no adjunct is required for effective retention and drainage activity.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer as defined herein which is electrically neutral. Representative nonionic monomers include acrylamide, methacrylamide, N-methylacrylamide, N,N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, vinyl methylsulfone, vinyl acetate, and the like. Preferred nonionic monomers include acrylamide and methacrylamide. Acrylamide is more preferred.

"Cationic monomer" means a monomer as defined herein which possesses a net positive charge. Cationic monomers have formula

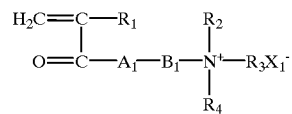

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H, $C_1$–$C_2$ alkyl or arylalkyl; and $X_1$ is an anionic counterion. Representative cationic monomers include dimethylaminoethylmethacrylate benzyl chloride salt (DMAEM.BCQ), dimethylaminoethylacrylate benzyl chloride salt (DMAEA.BCQ), dimethylaminoethylacrylate methyl chloride salt (DMAEA.MCQ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyltrimethylammonium chloride (MAPTAC), acrylamidopropyltrimethylammonium chloride (APTAC), and the like. Dimethylaminoethylacrylate methyl chloride salt and dimethylaminoethylmethacrylate benzyl chloride salt are preferred.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkoxy" and "alkoxyl" mean an alkyl-O-group wherein alkyl is defined herein. Representative alkoxy groups include methoxyl, ethoxyl, propoxyl, butoxyl, and the like.

"Alkylene" means a divalent group derived from a straight or branched chain saturated hydrocarbon by the removal of two hydrogen atoms. Representative alkylene groups include methylene, ethylene, propylene, and the like.

"Hydroxypropylene" means a propylene group substituted with hydroxy.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylalkyl" means an aryl-alkylene- group wherein aryl and alkylene are defined herein. Representative arylalkyl include benzyl, phenylethyl, phenylpropyl, 1-naphthylmethyl, and the like. A preferred arylalkyl is benzyl.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Anionic counterion" means any organic or inorganic anion which neutralizes the positive charge on the quaternary nitrogen atom of a cationic monomer as defined herein.

Representative anionic counterions include halogen, sulfate, phosphate, monohydrogen phosphate, nitrate, and the like. A preferred anionic counterion is halogen.

"Chain transfer agent" means any molecule, used in free-radical polymerization, which will react with a polymer radical forming a dead polymer and a new radical. Chain transfer agents are used herein to control the molecular weight of the cationic dispersion polymers of this invention. Representative Chain Transfer Agents are listed by K. C. Berger and G. Brandrup, *"Transfer Constants to Monomer, Polymer, Catalyst, Solvent, and Additive in Free Radical Polymerization,"* Section II, pp. 81–151, in *"Polymer Handbook,"* edited by J. Brandrup and E. H. Immergut, 3d edition, 1989, John Wiley & Sons, New York. Preferred chain transfer agents include salts such as sodium formate, sodium hypophosphite, and the like, alcohols such as methanol, ethanol, propanol, benzyl alcohol, glycerol, and the like and combinations thereof. Sodium formate, sodium hypophosphite and benzyl alcohol and combinations of these chain transfer agents are more preferred.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde Semi-Micro dilution viscometer, size 75. The viscometer is mounted in a perfectly vertical position in a constant temperature bath adjusted to 30±0.02° C. The error inherent in the calculation of RSV is about 0.5 dl/g. For the RSV measurements reported herein, the polymer concentration used is 0.045% polymer actives dissolved in either a 1.0N or a 0.125N sodium nitrate solution.

Similar RSVs measured for two linear polymers of identical or very similar composition is one indication that the polymers have similar molecular weights, provided that the polymer samples are treated identically and that the RSVs are measured under identical conditions.

"Dispersion polymer" means a water-soluble polymer dispersed in an aqueous continuous phase containing one or more inorganic salts. Representative examples of dispersion polymerization of water-soluble polymers in an aqueous continuous phase are found in U.S. Pat. Nos. 4,929,655, 5,006,590, 5,597,859 and 5,597,858 and European patent nos. 630 909 and 657 478.

The cationic dispersion polymer of this invention is prepared by preparing a mixture of water, one or more polyvalent anionic salts, nonionic monomers, cationic monomers and chain transfer agents, a particle stabilizing polymer, any polymerization additives such as chelants, pH buffers and charging the mixture to a reactor equipped with a mixer, a temperature regulating thermocouple, a nitrogen purging tube, and a water condenser.

A batch or semi-batch polymerization method can be employed to prepare the dispersion polymer of this invention. In a batch polymerization, the polymeric stabilizing polymers, chain transfer agents, monomers, chelant, and water are initially added to the reactor. All or a portion of the formulation salt/salts are also added to the reactor at this time. Mechanical agitation is started and the reactor contents are heated to the desired polymerization temperature. When the set-point temperature is reached, the initiator is added and a nitrogen purge is started. The reaction is allowed to proceed at the desired temperature until completion and then the contents of the reactor are cooled. Additional inorganic salts may be added during the polymerization to maintain processability or influence final product quality. Moreover, additional initiator may be added during the reaction to achieve desired conversion rates and facilitate reaction completeness. Post polymerization additives such as additional salt, water, stabilizers for molecular weight and pH and anti-foaming and biocidal agents may also be added to the reaction mixture.

Use of a semi-batch polymerization method will vary from a batch polymerization method only in that one or more of the monomers used in the synthesis of the polymer are held out in part or whole at the beginning of the reaction. The withheld monomer is then added over the course of the polymerization. If acrylamide monomer is used as a semi-batch monomer, a chelant is often also added during the semi-batch period.

Polyvalent anionic salts suitable for preparing the dispersion polymer include inorganic or organic sulfates, phosphates, chlorides or a mixture thereof. Preferred salts anionic salts include ammonium sulfate, sodium sulfate, magnesium sulfate, aluminum sulfate, ammonium hydrogen phosphate, sodium hydrogen phosphate, potassium hydrogen phosphate and ammonium chloride. The salts are used in aqueous solution typically having a combined total concentration of 15 weight percent or above in the product mixture.

Suitable polymeric stabilizing agents include water-soluble cationic polymers that are preferably soluble in the aqueous salt solution. The dispersant is used in an amount of from about 1 to about 10% by weight based on the total weight of the hydrophilic dispersion polymer.

The polymeric stabilizing agents, also referred to as stabilizers, keep the formed polymer particles from becoming agglomerated and forming a gel rather than a fine dispersion of particles. Suitable stabilizers include homopolymers of cationic diallyl-N,N-disubstituted ammonium monomers or N,N-disubstituted-aminoethyl(meth) acrylate monomers and their quaternary salts, copolymers of diallyl-N,N-disubstituted ammonium monomers and N,N-disubstituted-aminoethyl(meth)acrylate monomers and their quaternary salts and cationic polymers comprising 20 mole percent or more of cationic diallyl-N,N-disubstituted ammonium monomers or N,N-disubstituted-aminoethyl(meth) acrylate monomers and their quaternary salts and one or more nonionic monomers, preferably acrylamide, methacrylamide or styrene. The molecular weight of the stabilizer is preferably in the range of about 10,000 to 10,000,000. Preferred dispersants include homopolymers of diallyldimethyl ammonium chloride, dimethylaminoethylacrylate methyl chloride quaternary salt and dimethylaminoethylmethacrylate methyl chloride quaternary salt.

A multifunctional alcohol such as glycerin or polyethylene glycol may also be included in the polymerization system. The deposition of the fine particles is smoothly carried out in the presence of these alcohols.

The polymerization reaction is initiated by any means that results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis(2-amidinopropane) dihydrochloride and 2,2'-azobis(N,N'-dimethyleneisobutylamine) hydrochloride, and the like.

A seed polymer may be added to the reaction mixture before the initiating polymerization of the monomers for the purpose of obtaining a fine dispersion. The seed polymer is a water-soluble cationic polymer insoluble in the aqueous solution of the polyvalent anion salt. The monomer composition of the seed polymer need not be identical to that of the water-soluble cationic polymer formed during polymerization. The seed polymer is preferably a polymer prepared from the above monomer mixture by the process described herein.

Since the dispersion polymers do not contain surfactants or oil, the dispersion polymers are environmentally friendly. Moreover, the absence of oil in the dispersion polymers equates to such polymers having virtually zero volatile organic content (VOC), which is another environmental advantage of such polymers.

Preferred Embodiments

In a preferred aspect of this invention, the nonionic monomers are selected from acrylamide and methacrylamide and the cationic monomers are selected from dimethylaminoethylacrylate methyl chloride salt and dimethylaminoethylmethacrylate benzyl chloride salt.

In another preferred aspect, the low molecular weight water-soluble cationic dispersion polymer has a cationic charge of from about 10 mole percent to about 35 mole percent and a RSV of from about 0.3 dl/g to about 6 dl/g.

In another preferred aspect, the low molecular weight water-soluble cationic dispersion polymer has a cationic charge of from about 10 mole percent to about 35 mole percent and a RSV of from about 0.4 dl/g to about 5 dl/g.

In another preferred aspect, the low molecular weight water-soluble cationic dispersion polymer is a copolymer of acrylamide and dimethylaminoethylacrylate methyl chloride salt and has a cationic charge of from about 10 mole percent and a RSV of from about 0.5 dl/g to about 6 dl/g.

In another preferred aspect, the low molecular weight water-soluble cationic dispersion polymer is a terpolymer of acrylamide, dimethylaminoethylacrylate methyl chloride salt and dimethylaminoethylacrylate benzyl chloride salt and has a cationic charge of about 35 mole percent and a RSV of from about 0.5 dl/g to about 6 dl/g.

In a more preferred aspect, the low molecular weight water-soluble cationic dispersion polymer is a terpolymer of acrylamide, dimethylaminoethylacrylate methyl chloride salt and dimethylaminoethylacrylate benzyl chloride salt and has a cationic charge of about 35 mole percent and a RSV of from about 0.5 to about 3.0 dl/g.

The effective clarifying dosage of the cationic dispersion polymer depends on the characteristics of the water being treated and can be readily determined by one of ordinary skill in the art. Polymer should be dosed at a sufficient level to cause coagulation of the dispersed material and cause improved settling. Typical dosages are from about 0.1 to 500 ppm based on polymer actives. However, dosages can be much higher and are dependent on the type and concentration of solids in the stream. Dosages as high as 5000 ppm may be required.

In a preferred aspect, the water is selected from raw water, waste water and process water.

The foregoing may be better understood by reference to the following Examples, which are presented for illustration and are not intended to limit the scope of the invention.

EXAMPLE 1

A low RSV 90/10 mole percent acrylamide/dimethylaminoethylacrylate methyl chloride quaternary salt dispersion polymer is prepared as follows:

To a 1.5 liter resin reactor equipped with a stirrer, temperature controller and water condenser are added 338.92 g of deionized water, 226.57 g of a 49.5% solution of acrylamide (Nalco Chemical Company, Naperville, Ill.), 43.6 g of a 80% solution of dimethylaminoethylacrylate methyl chloride quaternary salt (CPS Chemical Co.), 13.5 g of glycerol, 5 g of adipic acid, 50 g of a 15% solution of a dimethylaminoethylacrylate methyl chloride quaternary salt homopolymer (IV=2.0, Nalco Chemical Co.), 0.4 g of EDTA, a chain transfer agent (see Table 1, sodium formate or sodium hypophosphite) and 302 g of ammonium sulfate. The mixture is heated to 48° C. and 1.0 g of a 1% solution of 2,2'-azobis(2-amidinopropane) dihydrochloride (Wako Chemicals USA, Inc., Richmond Va.) is added. The resulting solution is sparged with nitrogen at the rate of 1000 cc/min. After 15 minutes, the polymerization begins and the solution becomes viscous. Over the next four hours, the temperature is maintained at 48° C. At three hours after initiation, 3 g of a 1% solution of 2,2-azobis(2-amidinopropane) dihydrochloride is added. At fours after initiation, another 4 g of a 10% solution of 2,2'-azobis(2-amidinopropane) dihydrochloride is added to the dispersion and the mixture is further reacted for 4 hours at 48° C. Then 10 g of sodium thiosulfate and 5 g of acetic acid are added to the dispersion mixture. The RSVs of the resultant dispersion polymers are a function of the concentration of chain transfer agent, and ranged from 15.6 dl/g to 1.0 dl/g.

TABLE 1

Effect of Chain Transfer Agent (CTA) concentration on polymer RSV.

| CTA | concentration (ppm) | RSV (1M NaNO$_3$) |
|---|---|---|
| none (control) | — | 18.5 dl/g |
| sodium formate | 100 | 15.6 dl/g |
| sodium formate | 500 | 11.4 dl/g |
| sodium formate | 2000 | 6.0 dl/g |
| sodium hypophosphite | 500 | 2.0 dl/g |
| sodium hypophosphite | 1000 | 1.0 dl/g |

EXAMPLE 2

A 20.4% polymer solids, 65/15/20 mole percent acrylamide/dimethylaminoethylacrylate benzyl chloride quaternary salt/dimethylaminoethylacrylate methyl chloride quaternary salt dispersion terpolymer is prepared as follows.

A 1.5 liter reaction flask is fitted with a mechanical stirrer, thermocouple, condenser, nitrogen purge tube, an addition port and heating tape. To this reaction flask are added 153.0 g of acrylamide (48.6% aqueous solution (Nalco Chemical Co. of Naperville, Ill.), 81.8 g of dimethylaminoethylacrylate benzyl chloride quaternary salt (71.5% aqueous solution, Nalco Chemical Co. of Naperville, Ill.), 70.4 g dimethylaminoethylacrylate methyl chloride quaternary salt (79.5% aqueous solution, CPS Chemical Company of Old Bridge, N.Y.), 36.4 g of a homopolymer of dimethylaminoethylacrylate methyl chloride quaternary (15% aqueous solution, Nalco Chemical Co., Naperville, Ill.), 55.4 g of a homopolymer of diallyldimethylammonium chloride (12% aqueous solution, Nalco Chemical Co., Naperville, Ill.), 1.0 g of sodium formate, 0.2 g of ethylenediaminetetraacetic acid, tetra sodium salt (Dow Chemical Co., Midland, Mich.), 160.0 g of ammonium sulfate, 15.0 g sodium sulfate and 352.0 g of deionized water. The mixture is heated to 47° C. while stirring at 900 rpm. After reaching 47° C, 1.5 g of a 1.0% aqueous solution of 2,2'-azobis(2-amidinopropane) dihydrochloride (Wako VA-50, Wako Chemicals, Dallas, Tex.) is added to the reaction mixture and a constant purge of nitrogen is started. After two hours, 9.1 g of dimethylaminoethylacrylate benzyl chloride quaternary salt (71.5% aqueous solution), 7.8 g dimethylaminoethylacrylate methyl chloride quaternary salt (79.5% aqueous solution) and 3.0 g of a 1% aqueous solution of 2,2'-azobis(2-amidinopropane) dihydrochloride are added in sequence, in one shot portions. After an additional three hours, 4.0 g of a 10% aqueous solution of 2,2'-azobis(2-amidinopropane) dihydrochloride is added and the reaction temperature is raised to 55° C. After two hours at 55° C. the reaction is cooled, and 10.0 g acetic acid and 20.0 g ammonium chloride are added.

The final product is a smooth milky white dispersion with a bulk viscosity of 130 cp and a reduced specific viscosity of 9.8 dl/g, measured for a 0.045% solution of the polymer in 0.125N aqueous sodium nitrate at 30° C.

EXAMPLE 3

A 20.6% polymer solids, 65/15/20 mole percent acrylamide/dimethylaminoethylacrylate benzyl chloride quaternary salt/dimethylaminoethylacrylate methyl chloride quaternary salt dispersion terpolymer is prepared as follows:

To the reactor described in Example 1 are added 150.5 g of acrylamide (49.4% aqueous solution), 81.9 g of dimethylaminoethylacrylate benzyl chloride quaternary salt (71.5% aqueous solution), 70.4 g dimethylaminoethylacrylate methyl chloride quaternary salt (79.5% aqueous solution), 32.0 g of a homopolymer of dimethylaminoethylacrylate methyl chloride quaternary (15% aqueous solution), 48.0 g of a homopolymer of diallyldimethylammonium chloride (15% aqueous solution, Nalco Chemical Co., Naperville, Ill.), 0.1 g of sodium formate, 2.0 g of benzyl alcohol, 0.2 g of ethylenediaminetetraacetic acid, tetra sodium salt, 155.0 g of ammonium sulfate, 15.0 g sodium sulfate and 368.0 g of deionized water. The mixture is heated to 47° C. while stirring at 900 rpm. After reaching 47° C, 1.5 g of a 1.0% aqueous solution of 2,2'-azobis(2-amidinopropane) dihydrochloride is added to the reaction mixture and a constant purge of nitrogen is started. After two hours, 4.6 g of dimethylaminoethylacrylate benzyl chloride quaternary salt (71.5% aqueous solution) and 4.0 g dimethylaminoethylacrylate methyl chloride quaternary salt (79.5% aqueous solution) are added in sequence, in one shot portions. After an additional hour, a second, equal monomer addition is made as before (4.6 g of dimethylaminoethylacrylate benzyl chloride quaternary salt (71.5% aqueous solution) and 4.0 g dimethylaminoethylacrylate methyl chloride quaternary salt (79.5% aqueous solution)), followed by addition of 3.0 g of a 1% aqueous solution of 2,2'-azobis(2-amidinopropane) dihydrochioride. After an additional three hours, 4.0 g of a 10% aqueous solution of 2,2'-azobis(2-amidinopropane) dihydrochloride is added and the reaction temperature is raised to 55° C. After 1.5 hours at 55° C. the reaction is cooled, and 10.0 g acetic acid and 10.0 g ammonium chloride are added.

The final product is a foamy, milky white dispersion with a bulk viscosity of 360 cp and a reduced specific viscosity of 5.2 dl/g, measured for a 0.045% solution of the polymer in 0.125N aqueous sodium nitrate at 30° C.

Various levels and/or combinations of sodium formate and benzyl alcohol are used to modify polymer molecular weight. Examples of some of the tested combinations and their effect on molecular weight are listed Table 1.

TABLE 2

Effect of Chain Transfer Agent on Molecular Weight

| Grams of sodium formate in approximately 1 kg reaction | Grams of benzyl alcohol in approximately 1 kg reaction | RSV (dl/g) (0.125N NaNO$_3$) |
| --- | --- | --- |
| 0.5 | 0 | 13.2 |
| 1.0 | 0 | 9.8 |
| 5.0 | 0 | 2.5 |
| 0.1 | 2.0 | 5.2 |
| 6.0 | 2.0 | 1.5 |
| 5.0 | 2.0 | 1.6 |

The experimental polymer products tested in Examples 4–8 are listed in Table 3. Polymer A is a representative high molecular weight AcAm/DMAEA.MCQ dispersion polymer available from Nalco Chemical Company. Polymers B–E are low molecular weight AcAm/DMAEA.MCQ dispersion polymers prepared according to Example 1. Polymer F is a representative high molecular weight AcAmn/DMAEA.MCQ/DMAEA.BCQ dispersion polymer available from Nalco Chemical Company. Polymers G–K are low molecular weight AcAm/DMAEA.MCQ/DMAEA.BCQ dispersion polymers prepared according to Examples 2–3. Polymers L–O are representative commercially available solution or emulsion coagulants.

TABLE 3

| Polymer Number | Cationic Charge (Mole %) | RSV (dl/g) | Product Type (Form) | Cationic* Chemistry Type |
| --- | --- | --- | --- | --- |
| A | 10 | 13.0 | Dispersion | DMAEA.MCQ |
| B | 10 | 6.0 | Dispersion | DMAEA.MCQ |
| C | 10 | 11.0 | Dispersion | DMAEA.MCQ |
| D | 10 | 2.0 | Dispersion | DMAEA.MCQ |
| E | 10 | 1.0 | Dispersion | DMAEA.MCQ |
| F | 35 | 20 | Dispersion | DMAEA.MCQ/BCQ |
| G | 35 | 15.3 | Dispersion | DMAEA.MCQ/BCQ |
| H | 35 | 9.8 | Dispersion | DMAEA.MCQ/BCQ |
| I | 35 | 5.2 | Dispersion | DMAEA.MCQ/BCQ |
| J | 35 | 2.5 | Dispersion | DMAEA.MCQ/BCQ |
| K | 35 | 1.5 | Dispersion | DMAEA.MCQ/BCQ |
| L | 100 | 0.2 | Solution | DADMAC |
| M | 50 | 18.6 | Emulsion | DMAEA.MCQ |
| N | 30 | 22.5 | Emulsion | DMAEA.MCQ |
| O | 100 | 0.1 | Solution | EPI-DMA |

The effectiveness of the low molecular weight water-soluble cationic dispersion polymers of this invention for clarifying wastewater is demonstrated using the procedures summarized below.

Polymer Solution Preparation for Testing

A one g sample of the dispersion polymer product is added to 199 g of deionized water and mixed at 800 rpm for 30 minutes using a cone drive mix motor fitted with a 1.5 inch diameter cage paddle. The 0.5 percent solution produced by this method is then used without further dilution.

Jar Test

The clarification of solids from water is tested using a Gang Stirrer and employing standard jar testing practices. For example, a 250 ml sample of the test water is placed into a 500 ml beaker and stirred at 200 rpm on the Gang Stirrer. To the stirred water sample, an aliquot of the polymer solution is added. The mixture is stirred for one minute at 200 rpm followed by slow mixing for five minutes at 50 rpm. The solids are then allowed to settle without stirring for five minutes. Solids settled volume and supernatant water clarity (turbidity) are measured. The turbidity is measured using a Hach 2100 P turbidimeter.

Drainage Test

Drainage testing involves treating a sample of a solids slurry or sludge with polymer and mixing the sludge and polymer together until effective flocculation occurs. Then the sludge-polymer mixture is poured onto a belt filter cloth and the water drained at 5, 10 and 15 seconds is measured. The water drainage and filtrate turbidity can be used as a relative performance measurement between polymers and polymer dosages.

The drainage testing performed to evaluate the polymers of this invention requires placing 200 ml of the water/solids slurry, in a 500 ml graduated cylinder. Then an aliquot of the polymer solution and enough additional water is added to the sludge in the 500 ml cylinder to bring the total volume to 225 ml in the 500 ml graduate cylinder. The individual amounts of polymer solution and water added to the sludge can vary to allow for different dosages of polymer. However, the total volume of polymer solution and dilution water remained at 225 ml. The cylinder is then capped and inverted 5 times to thoroughly mix the polymer and the sludge. The flocculated solids are then poured onto a belt filter fabric and the water drainage is recorded at 10 seconds. The amount of water drained and the clarity (turbidity) of the filtrate are recorded. The turbidity is measured using a Hach 2100 P turbidimeter.

EXAMPLE 4

Secondary biosolids settling is evaluated in this example. A 500 ml water sample is treated using the Jar Test Procedure. The results are presented in Table 4. In Example 4, the water turbidity is measured to show performance of the low molecular weight dispersion polymers. The data show that the lowest molecular weight DMAEA.MCQ/BCQ polymers tested produced the cleanest (lowest turbidity) water. These polymers are H and J. The higher molecular weight experimental polymers tended to require high polymer dosages to achieve the lower turbidity. Compared to the standard solution polymer L, the low molecular weight dispersion polymers are much more active in coagulating the dispersed solids.

TABLE 4

Chemical Plant No. 1: Aeration Basin Biosolids Clarification Supernatant Water Turbidity (NTU)

| Polymer Dose (ppm) | O | A(17) | B(6.0) | C(11.0) | G(20) | H(9.8) | J(2.5) |
|---|---|---|---|---|---|---|---|
| 8 |  | 35.7 | 44.3 | 31.9 |  | 21.5 | 31.9 |
| 10 |  | 37.6 | 51.1 | 32 |  | 18 | 25.5 |
| 11 |  |  |  |  | 26.3 |  |  |
| 12 |  | 29.6 | 37 | 28.1 |  | 13.8 | 20.4 |
| 13 |  |  |  |  | 25.2 |  |  |
| 15 |  | 27 | 40 | 23.6 |  | 12.2 | 18.3 |
| 16 |  |  |  |  | 16 |  |  |
| 18 |  | 24.6 | 36.1 | 21.2 |  | 11.4 | 16.4 |
| 20 |  |  |  |  | 18.4 |  |  |
| 24 |  |  |  |  | 17 |  |  |
| 27 | 26.5 |  |  |  |  |  |  |
| 33 | 24.4 |  |  |  |  |  |  |
| 40 | 24 |  |  |  |  |  |  |
| 50 | 19.8 |  |  |  |  |  |  |
| 60 | 16.9 |  |  |  |  |  |  |

EXAMPLE 5

In Example 5, a storm water treatment application is evaluated. Here raw water is treated with polymer using the Jar Test Procedure and supernatant turbidity is measured to determine performance of the polymers. The results presented in Table 5 show the lowest molecular weight polymer (J) is the best performing experimental polymer compared to the current commercial coagulant (L), for this application.

TABLE 5

Chemical Plant No. 2: Storm Water Clarification Supernatant Water Turbidity (NTU)

| Polymer Dose (ppm) | L | A(17) | B(6.0) | C(11.0) | G(20) | H(9.8) | J(2.5) |
|---|---|---|---|---|---|---|---|
| 0 | 127 | 127 | 127 | 127 | 127 | 127 | 127 |
| 5 |  | 92.2 |  |  |  | 77.9 | 52 |
| 7.5 | 113 | 80.7 | 91.9 | 104 | 97.9 | 57.7 | 53.4 |
| 10 | 105 | 76.7 | 77.5 | 94.1 | 75.7 | 46.3 | 18.5 |
| 13 | 84 | 43.2 | 76.1 | 92 | 70 | 12.7 | 11.2 |
| 24 | 124 |  | 62.5 | 67 | 55.7 |  |  |

EXAMPLE 6

In Example 6 the treatment of the oily waste water is performed using the Jar Test Procedure and supernatant turbidity is measured to determine performance of the polymers. The results are shown in Table 6. The testing shows that these polymers could break the emulsion and produce settable solids and cleaner supernatant water.

TABLE 6

Chemical Plant No. 3: Oil in Water Emulsion Breaking Clarification Supernatant Water Turbidity (NTU)

| Polymer Dose (ppm) | A(17) | B(6.0) | C(11.0) | G(20) | H(9.8) | J(2.5) |
|---|---|---|---|---|---|---|
| 0 | 516 | 516 | 516 | 516 | 516 | 516 |
| 4 | 108 | 134 | 78.1 |  |  |  |
| 5 |  |  |  | 99.5 | 150 | 196 |
| 6 | 96.5 | 95.5 | 73.9 |  |  |  |
| 8 | 88 | 96.4 | 82.1 | 91.5 | 100 | 148 |
| 10 | 84.1 | 86.5 | 77.5 |  |  |  |
| 11 |  |  |  | 88 | 69.2 | 109 |
| 12 |  |  |  |  |  |  |
| 13 |  |  |  | 78.9 | 65.2 | 104 |
| 16 |  |  |  |  |  |  |

EXAMPLE 7

In Example 7, biosolids settling testing is performed using the Jar Test Procedure and supernatant turbidity and settled solids volume are recorded. The best performing dispersion polymers are I, J, K, with RSVs of 5.2, 2.5 and 1.5, respectively. The performance trend found in this application is that the 35 mole percent dispersion polymers with RSVs between 6 and 1.5 dl/g produced the lowest turbidity supernatant water and lowest settled solids volume. Thus, these polymers outperformed the higher molecular weight dispersion polymers.

TABLE 7

Chemical Plant No. 4: Secondary Biosolids Clarification
Supernatant Water Turbidity (NTU)/Settled Solids Volume (ml)

| Polymer Number | RSV (dl/g) | Polymer Dosage (ppm) | | | | |
|---|---|---|---|---|---|---|
| | | 0 | 2.5 | 5 | 10 | 15 |
| A | 17 | 242/200 | 177/170 | 37.1/160 | 34.5/140 | 31.2/150 |
| B | 6.0 | 242/200 | 42.2/180 | 40.2/180 | 41.6/170 | 39.2/160 |
| C | 11.0 | 242/200 | 58.6/180 | 45.6/180 | 37.8/200 | 42.8/200 |
| D | 2.0 | 242/200 | 42.4/150 | 37.6/150 | 31.6/150 | 38.6/150 |
| E | 1.0 | 242/200 | 82.7/160 | 35.4/150 | 31.6/140 | 28.3/140 |
| F | 25 | 242/200 | 234/170 | 204/150 | 99.2/150 | 315/150 |
| G | 20 | 242/200 | 45.2/150 | 37.5/140 | 37.6/110 | 33.2/120 |
| H | 9.8 | 242/200 | 83.7/150 | 33.5/150 | 21.8/140 | 20.0/140 |
| I | 5.2 | 242/200 | 38.9/150 | 21.3/150 | 18.3/140 | 12.0/140 |
| J | 2.5 | 242/200 | 39.8/150 | 20.5/140 | 14.4/130 | 10.6/110 |
| K | 1.5 | 242/200 | 196/170 | 150/160 | 26.0/150 | 12.8/140 |

EXAMPLE 8

In this example, sludge from a municipal plant is used to evaluate the coagulant effects of the experimental polymers. Drainage testing is performed where the experimental polymer is added to the sludge and mixed with the solids. Then, the cationic commercial flocculant is added at the same dosage for all the tests. The sludge is mixed and poured onto a filter screen. The water drainage and turbidity of the filtrate water are recorded. Changes in drainage volume and turbidity are solely due to changes in the experimental polymer molecular weight (RSV) and composition. Greater water drainage with lower turbidity is generally desired at low polymer dosages. The results are presented in Table 8. Polymer N is the standard flocculant used for the drainage test. The results show the greatest reduction in turbidity and greatest water drainage volume occurred with the experimental dispersion polymers with RSVs less than about 6 dl/g. The best performing 10 mole percent cationic dispersion polymer is B (RSV=6 dl/g) and the best performing 35 mole percent cationic dispersion polymer is K (RSV=1.5 dl/g).

TABLE 8

Municipal Plant No. 1: Sludge Dewatering
Filtrate Water Turbidity (NTU)/Water Drainage Volume (ml)

| Polymer Number | RSV (dl/g) | 0.5% Dispersion Dose (ml) | Polymer N Dosage (ml of a 0.5% Solution) | | | | |
|---|---|---|---|---|---|---|---|
| | | | 1 | 1.5 | 2 | 2.5 | 3 |
| N | 22 | 0 | 456/82 | 114/115 | 36/140 | 53/150 | |
| B | 6.0 | 1.5 | 33/115 | | 57/110 | | 62/120 |
| D | 2.0 | 1.5 | 41/110 | | 44.8/105 | | 53.4/115 |
| E | 1.0 | 1.5 | 55.1/115 | | 66.2/110 | | 74.4/108 |
| H | 9.8 | 1.5 | 80/115 | | 45/125 | | 32.4/150 |
| I | 5.2 | 1.5 | 52.5/115 | | 27/135 | | 21.5/152 |
| J | 2.5 | 1.5 | 82/138 | | 27/142 | | 35.5/145 |
| K | 1.5 | 1.5 | 31.7/120 | | 35/135 | | 20.4/145 |

EXAMPLE 9

The effectiveness of the low molecular weight water-soluble cationic dispersion of this invention as a retention and drainage aid is shown in Example 9. Testing is performed by adding 2.5 ppm of the low molecular weight polymer into 500 ml of paper furnish and mixing by pouring the mixture from beaker to beaker. Five beaker to beaker pours are used and then the cationic flocculent at 10 ppm is added and the mixture is mixed for an additional 7 beaker to beaker pours. The mixture is then poured onto a retention wire and the turbidity of the filtrate is measured. The results presented in Table 9 clearly show the lower RSV (molecular weight) polymers have more activity in reducing filtrate turbidity than the high molecular weight polymers and the L standard coagulant chemistry.

TABLE 9

Paper Mill 1: Retention and Drainage Testing
Measured Water Turbidity (NTU) at 2.5 ppm Dosage

| Polymer Number | RSV (dl/g) | Turbidity (NTU) |
|---|---|---|
| No Polymer | | 750 |
| L | 0.2 | 273 |
| F | 25 | 151 |
| G | 20 | 138 |
| H | 9.8 | 101 |
| I | 5.2 | 131 |
| J | 2.5 | 80 |
| K | 1.5 | 76 |

What is claimed is:

1. A method of clarifying water containing dispersed solids comprising adding to the water an effective clarifying amount of a low molecular weight water-soluble cationic dispersion terpolymer prepared by polymerizing dimethylaminoethylacrylate methyl chloride salt, dimethylaminoethylacrylate benzyl chloride salt, acrylamide one or more chain transfer agents under free radical forming conditions in an aqueous solution of an anionic salt in the presence of a stabilizer polymer, wherein the cationic dispersion has a cationic charge of about 35 mole percent to about 75 mole percent and an RSV of from about 0.5 dl/g to about 6 dl/g and wherein the cationic terpolymer contains at least about 15 mole percent dimethylaminoethylacrylate benzyl chloride salt to coagulate said dispersed solids, and separating the coagulated solids from a clarified water.

2. The method of claim 1 wherein the cationic terpolymer has a cationic charge of about 35 mole percent.

3. The method of claim 2 wherein the low molecular weight water-soluble cationic dispersion terpolymer has an RSV of about 1.5 dl/g to about 2.5 dl/g.

4. A method of dewatering sludge containing dispersed solids comprising adding to the sludge an effective amount of a low molecular weight water-soluble cationic dispersion terpolymer prepared by polymerizing dimethylaminoethylacrylate methyl chloride salt, dimethylaminoethylacrylate benzyl chloride salt, acrylamide and one or more chain transfer agents under free radical forming conditions in an aqueous solution of an anionic salt in the presence of a stabilizer polymer, wherein the cationic dispersion has a cationic charge of about 35 mole percent to about 75 mole percent and an RSV of from about 0.5 dl/g to about 6 dl/g and wherein the cationic terpolymer contains at least about 15 mole percent dimethylaminothylacrylate benzyl chloride salt to coagulate said dispersed solids, and dewatering said sludge.

5. The method of claim 4 wherein the cationic terpolymer has a cationic charge of about 35 mole percent.

6. The method of claim 5 wherein the low molecular weight water-soluble cationic dispersion terpolymer coagulant has an RSV of about 1.5 dl/g to about 2.5 dl/g.

7. A method of breaking an oil-in-water emulsion containing dispersed solids comprising adding to the water an effective clarifying amount of a low molecular weight water-soluble cationic dispersion terpolymer prepared by polymerizing dimethylaminoethylacrylate methyl chloride salt, dimethylaminoethylacrylate benzyl chloride salt, acrylamide and one or more chain transfer agents under free radical forming conditions in an aqueous solution of an anionic salt in the presence of a stabilizer polymer, wherein the cationic dispersion has a cationic charge of about 35 mole percent to about 75 mole percent and an RSV of from about 0.5 dl/g to about 6 dl/g and wherein the cationic terpolymer contains at least about 15 mole percent dimethylaminothylacrylate benzyl chloride salt to break said emulsion and coagulate said dispersed solids, and separating the coagulated solids from a clarified water.

8. The method of claim 7 wherein the cationic terpolymer has a cationic charge of about 35 mole percent.

9. The method of claim 8 wherein the low molecular weight water-soluble cationic dispersion terpolymer coagulant has a RSV of about 1.5 dl/g to about 2.5 dl/g.

* * * * *